(12) United States Patent
Yamaguchi et al.

(10) Patent No.: US 9,380,278 B2
(45) Date of Patent: Jun. 28, 2016

(54) VIDEO PROJECTION DEVICE AND METHOD WITH CONTROL OF LIGHT SOURCE BASED ON IMAGE SIGNAL

(71) Applicant: Panasonic Corporation, Kadoma-shi, Osaka (JP)

(72) Inventors: Akiyoshi Yamaguchi, Osaka (JP); Masutaka Inoue, Osaka (JP); Masahiro Haraguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 203 days.

(21) Appl. No.: 14/156,790

(22) Filed: Jan. 16, 2014

(65) Prior Publication Data

US 2014/0198261 A1 Jul. 17, 2014

(30) Foreign Application Priority Data

Jan. 17, 2013 (JP) ................................. 2013-006013
Nov. 22, 2013 (JP) ................................. 2013-241594

(51) Int. Cl.
*G03B 21/14* (2006.01)
*H04N 9/31* (2006.01)
(52) U.S. Cl.
CPC ........... *H04N 9/3114* (2013.01); *H04N 9/3182* (2013.01); *G03B 21/14* (2013.01)

(58) Field of Classification Search
CPC ........... G03B 21/14; G03B 21/00; H04N 9/31
See application file for complete search history.

(56) References Cited

U.S. PATENT DOCUMENTS

2008/0291403 A1 11/2008 Kameta
2011/0019164 A1* 1/2011 Wu ........................ G03B 21/14
  353/84
2011/0317133 A1* 12/2011 Brueckel ............ H05B 41/2928
  353/85

FOREIGN PATENT DOCUMENTS

JP 2008-292607 12/2008

* cited by examiner

*Primary Examiner* — Sultan Chowdhury
*Assistant Examiner* — Danell L Owens
(74) *Attorney, Agent, or Firm* — Hamre, Schumann, Mueller & Larson, P.C.

(57) ABSTRACT

A video projection device according to this disclosure is provided with a splitter having a first region including a plurality of segments and a second region including at least one segment and configured to split a light flux emitted from a light source into a plurality of light of colors in a time-divisional manner by having the light flux enter into each one of the segments, and a video display element configured to modulate the light of the colors based on a image signal to be input and to form a image, and a controller configured to calculate a light intensity and to control the light source based on a result of the calculation.

10 Claims, 12 Drawing Sheets

VIDEO PROJECTION DEVICE AND METHOD WITH CONTROL OF LIGHT SOURCE BASED ON IMAGE SIGNAL

BACKGROUND

This disclosure relates to a video projection device for projecting images.

JP 2008-292607 A discloses a video projection device. This video projection device includes a light source, a color wheel, and a controller.

The controller outputs a first control signal and a second control signal for increasing and decreasing one of current, voltage, and electrical power that are supplied to a light source based on a image signal that are externally supplied synchronously with timing of a plurality of colors of a color wheel.

The video projection device determines one of brightness and a color scale to be prioritized according to the image signal, and adjusts brightness and a color scale separately based on the determination result. With this, it is possible to improve image quality.

SUMMARY

An object of this disclosure is to provide a video projection device capable of effectively improving quality of images that are projected.

A video projection device according to this disclosure is provided with: a splitter having a first region including a plurality of regions and a second region including at least one region, and configured to split a light flux emitted from a light source into a plurality of light of colors in a time-divisional manner by having the light flux enter into each one of the segments; a video display element configured to modulate the light of the colors based on a image signal to be input, and to form a image; and a controller configured to perform calculation such that when the image signal is determined to satisfy a predetermined first condition, a light intensity of the light entering into the second region is set higher than that in a case in which the first condition fails to be satisfied, that when the image signal is determined to satisfy a second condition different from the first condition, the light intensity of the light entering into the second region is set lower than that in a case in which the second condition fails to be satisfied, and that a light intensity of the light entering into the first region so as to make a color temperature of a light flux obtained by combining first transmitted light generated by the light passing the first region and second transmitted light generated by the light passing the second region be a predetermined target color temperature, and configured to control the light source based on a result of the calculation.

The video projection device according to this disclosure is effective for improving quality of images that are projected.

DETAILED DESCRIPTION

Hereinafter, exemplary embodiments will be described with reference to the drawings in detail as needed. However, there is a case in which unnecessary descriptions, such as details for a well-known matter and an overlapping description for a substantially identical component, are omitted in order to prevent the following description from being too lengthy, and to facilitate understanding of a person skilled in the art.

The appended drawings and the following description are provided so that a person skilled in the art may fully understand this disclosure, and are not intended to limit the matters defined in the scope of the disclosure.

First Exemplary Embodiment

Hereinafter, a first exemplary embodiment will be described with reference to FIGS. 1 to 8.

1. General Outline

Figure 1:
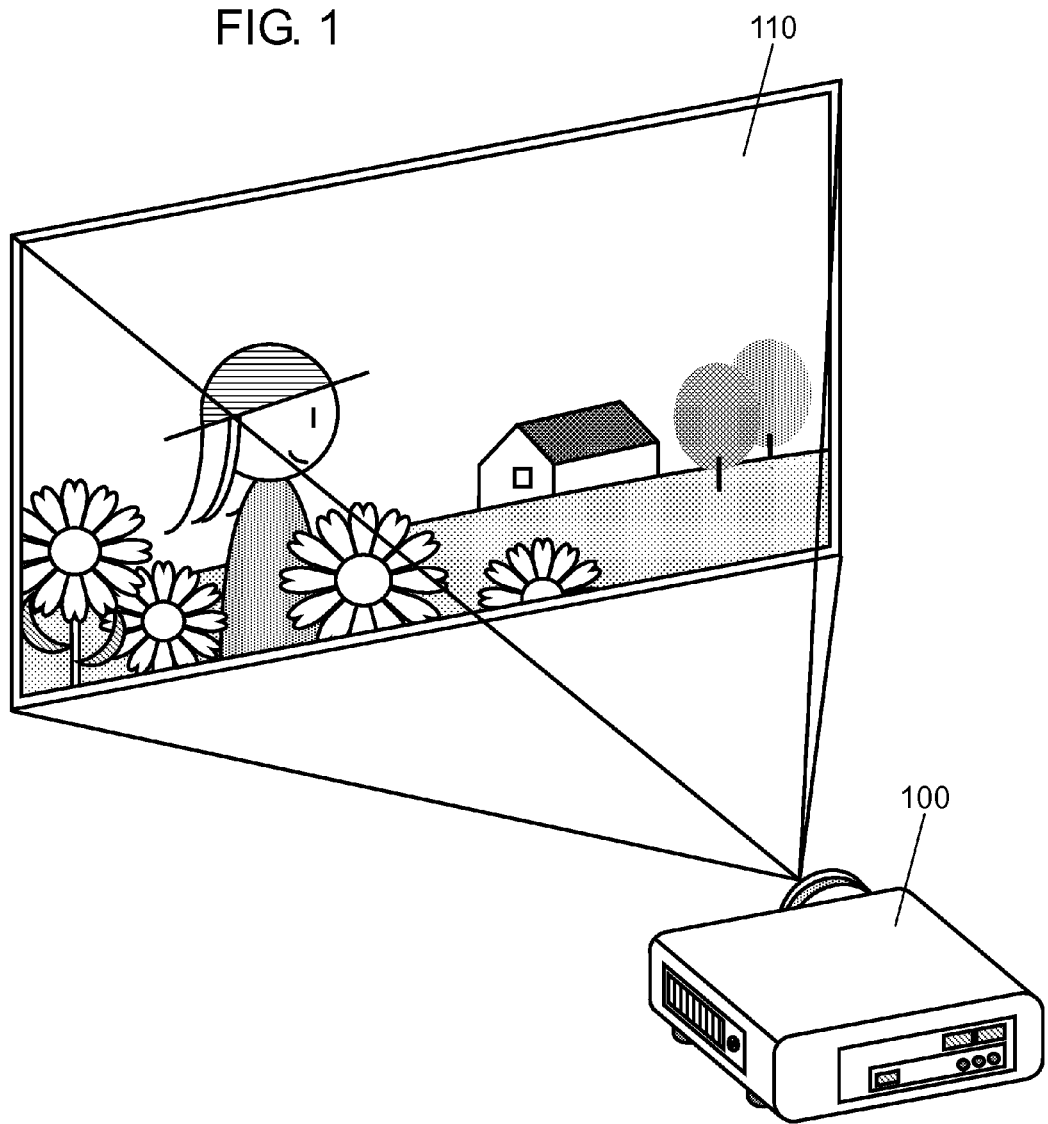
FIG. 1 is an external perspective view illustrating a projector 100 according to a first exemplary embodiment.

A general outline of projector 100 will be described with reference to FIG. 1. FIG. 1 is an external perspective view of projector 100. Projector 100 generates a image based on a image signal to be input. Projector 100 projects the generated image on screen 110.

1-2. Configuration 1-2-1. Overall Configuration

Figure 2:
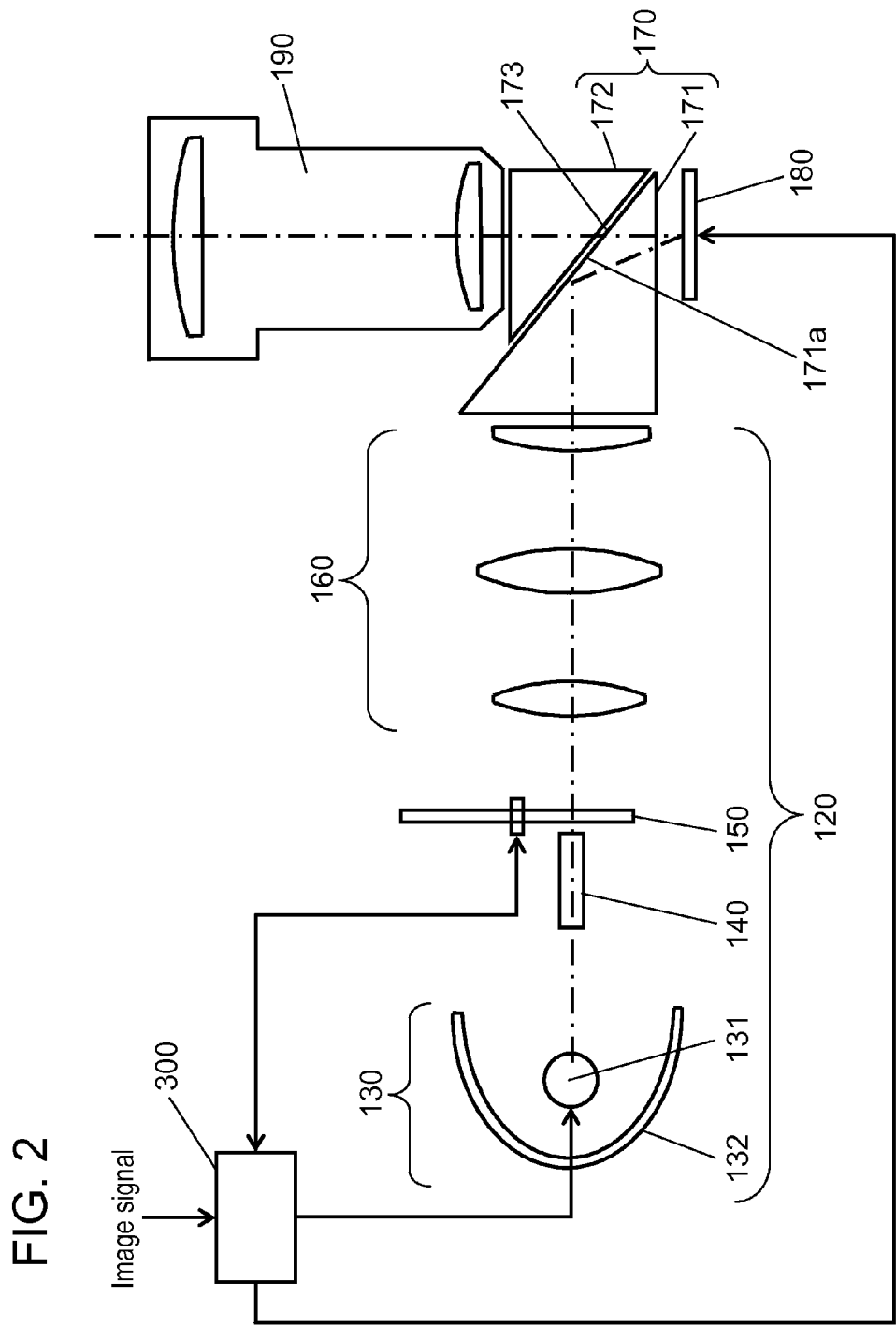
FIG. 2 is a schematic view illustrating the projector 100 according to the first exemplary embodiment.

An overall configuration of projector 100 will be described with reference to FIG. 2. FIG. 2 is a schematic view illustrating the configuration of projector 100. Projector 100 includes illuminator 120, TIR (Total Internal Reflection) prism 170, DMD (Digital Mirror Device) 180, projecting unit 190, and controller 300. Illuminator 120 generates and emits illuminating light of a plurality of colors (color light) in a time-divisional manner. TIR prism 170 causes the illuminating light to enter into DMD 180. DMD 180 modulates the illuminating light based on a image signal to generate a image. Projecting unit 190 projects the generated image on screen 110.

Next, a detailed configuration of projector 100 will be described.

Illuminator 120 includes light source 130, rod integrator 140, color wheel 150, and relay optical system 160. Light source 130 includes arc tube 131 and reflector 132.

Arc tube 131 emits a white light flux (white color light) containing red color light, green color light, and blue color light having wavelength bands different from each other. Arc tube 131 is configured as an extra high pressure mercury lamp or a metal halide lamp, for example. In this exemplary embodiment, a color temperature of the white color light emitted from light source 130 (arc tube 131) is 6000 K.

Reflector 132 reflects the light flux emitted from arc tube 131 to be focused to rod integrator 140. The light flux emitted from light source 130 is thus enters into rod integrator 140.

Rod integrator 140 uniformizes illuminance of the incident light. Rod integrator 140 includes an entrance face and an emission face. Rod integrator 140 is provided at a position at which the light flux emitted from light source 130 enters into the entrance face. The light flux entering into the entrance face of rod integrator 140 repeats total reflection within rod integrator 140, and is emitted through the emission face of rod integrator 140 with a uniformized illuminance distribution.

Color wheel 150 is in a disk shape. A first region and a second region are disposed on a disk surface of color wheel 150. The disk surface of color wheel 150 includes a red segment, a green segment, a blue segment, and a white segment that are divided at a predetermined angle. The first region includes the red segment, the green segment, and the blue segment. The second region includes the white segment.

The red segment has a red color filter. The green segment has a green color filter. The blue segment has a blue color filter. The white segment has a white color filter. The red color filter allows the red color light of a wavelength on the order from 580 nm to 700 nm out of the light emitted from light source 130 to pass. The green color filter allows the green color light of a wavelength on the order from 480 nm to 580 nm out of the light emitted from light source 130 to pass. The blue color filter allows the blue color light of a wavelength on the order from 400 nm to 480 nm out of the light emitted from light source 130 to pass. The white color filter allows entire light emitted from light source 130 to pass. Specifically, the red segment emits the red color light when the light flux from light source 130 enters in this segment. The green segment emits the green color light when the light flux from light source 130 enters in this segment. The blue segment emits the blue color light when the light flux from light source 130 enters in this segment. The white segment emits the entered light flux as the white color light when the light flux from light source 130 enters in this segment. Therefore, a color temperature of the white color light emitted from the white segment is 6000 K, similarly to that of the white color light from light source 130.

Color wheel 150 is disposed immediately after the emission face of rod integrator 140. Color wheel 150 rotates at a predetermined rotating speed by a driving mechanism (not depicted). The predetermined rotating speed is n times of a frame rate of a image signal to be input (n is an integer).

For example, when the frame rate of the image signal is 60 frame/second, the rotating speed of color wheel 150 may be 180 rps. Due to the rotation of color wheel 150, the light flux from light source 130 sequentially enters into each segment, and converted into the color light corresponding to this segment. In this manner, color wheel 150 splits the light emitted from light source 130 time-divisionally into the color light of the plurality of colors. Color wheel 150 is one example of a splitter.

Relay optical system 160 directs the color light that has passed color wheel 150 to TIR prism 170. Relay optical system 160 is configured by a plurality of lenses that is able to maintain uniformity of the illuminance distribution of the light emitted from rod integrator 140.

TIR prism 170 directs the light emitted from relay optical system 160 to DMD 180. TIR prism 170 is configured by prism 171 and prism 172. There is air layer 173 at a vicinal plane between prism 171 and prism 172. Air layer 173 is a thin layer of air. The light flux from relay optical system 160 enters into boundary 171a of prism 171 with air layer 173 at an angle equal to or greater than an optimum angle. Thus, the light flux is totally reflected on boundary 171a. The light flux that has been totally reflected enters into DMD 180.

DMD 180 includes 1920×1200 micromirrors that are two-dimensionally positioned. DMD 180 deflects each of the micromirrors according to the image signal. With this, DMD 180 splits the entered light flux into light to enter into projecting unit 190 and light to be reflected toward outside of an effective range of projecting unit 190. The light flux to enter into projecting unit 190 out of the light flux reflected on DMD 180 forms a image based on the image signal. By being synchronized with the rotation of color wheel 150, DMD 180 is able to generate a image corresponding to the light of each color that has been entered. In this manner, DMD 180 modulates the light of each color based on the image signal to generate the image. The light flux emitted from DMD 180 (image) enters into TIR prism 170. The light flux that has entered into TIR prism 170 enters into boundary 171a at an angle equal to or smaller than the optimum angle. Therefore, the light flux passes boundary 171a and air layer 173 and enters into projecting unit 190. DMD 180 is one example of a video display element.

Projecting unit 190 is an optical system for spreading the light flux that has been entered (image). Projecting unit 190 has a focusing function and a zooming function. Projecting unit 190 projects the image formed by DMD 180 on screen 110.

Controller 300 controls light source 130, color wheel 150, and DMD 180 based on the image signal to be input, and generates the image based on the image signal. Controller 300 causes color wheel 150 to rotate at a predetermined rotating speed and a phase synchronously with a synchronization signal of the image signal. Controller 300 detects the rotating speed and/or the phase of color wheel 150, and controls the rotating speed and/or the phase of color wheel 150 synchronously with the image signal. Further, controller 300 controls the deflection of each micromirror of DMD 180 synchronously with the image signal and its synchronization signal. With this, controller 300 causes DMD 180 to generate the image based on the image signal from the light of each color from color wheel 150. At timing at which the red color light emitted from the red segment of color wheel 150 enters into DMD 180, controller 300 controls DMD 180 so as to generate a image relating the red color out of the image to be formed from the image signal. Similarly, at timing at which the green color light emitted from the green segment enters into DMD 180, controller 300 controls DMD 180 so as to generate a image relating the green color. At timing at which the blue color light emitted from the blue segment enters into DMD 180, controller 300 controls DMD 180 so as to generate a image relating the blue color. At timing at which the white color light emitted from the white segment enters into DMD 180, controller 300 controls DMD 180 so as to generate a image relating the white color. In this manner, the image of each color is formed and projected in a time-divisional manner. By observing these images, a user is able to recognize the image based on the image signal.

Further, controller 300 controls light intensity of the light flux that is directed from light source 130 into each segment based on the image signal. Specifically, controller 300 controls the light intensity of light source 130 by controlling at least one of the current, the voltage, and the electrical power to be applied to arc tube 131 of light source 130 based on the image signal. In this exemplary embodiment, it is assumed that controller 300 controls the light intensity by controlling the current to be applied to light source 130 (light source current). The control of the light intensity will be described later in detail.

1-3. Output Operation of Image

Next, an output operation of the image by projector 100 thus configured will be described. When forming and projecting the image based on the image signal, controller 300 of projector 100 controls the light intensity of light source 130 based on the image signal to be input. Further, controller 300 corrects the image signal according to the control of the light intensity of light source 130. This operation will be described in detail below.

1-3-1. General Outline of Control of Light Intensity of Image

Figure 3:
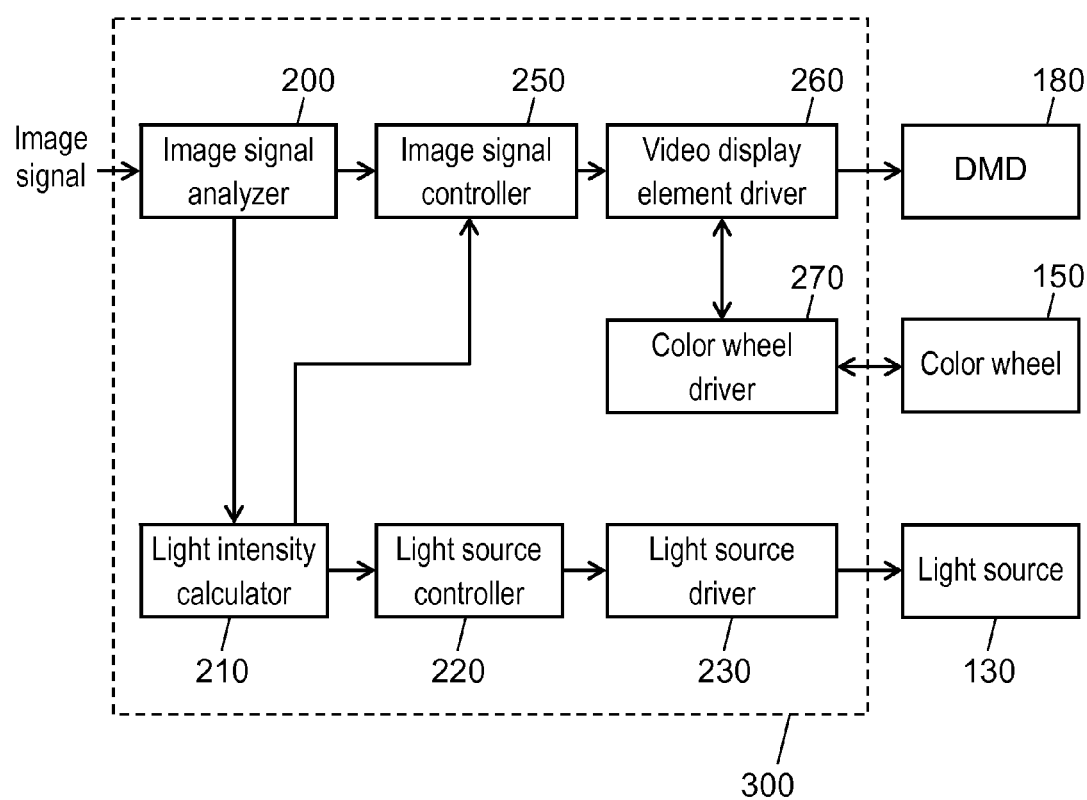
FIG. 3 is a block diagram illustrating a configuration of a controller 300 according to the first exemplary embodiment.
Figure 4:
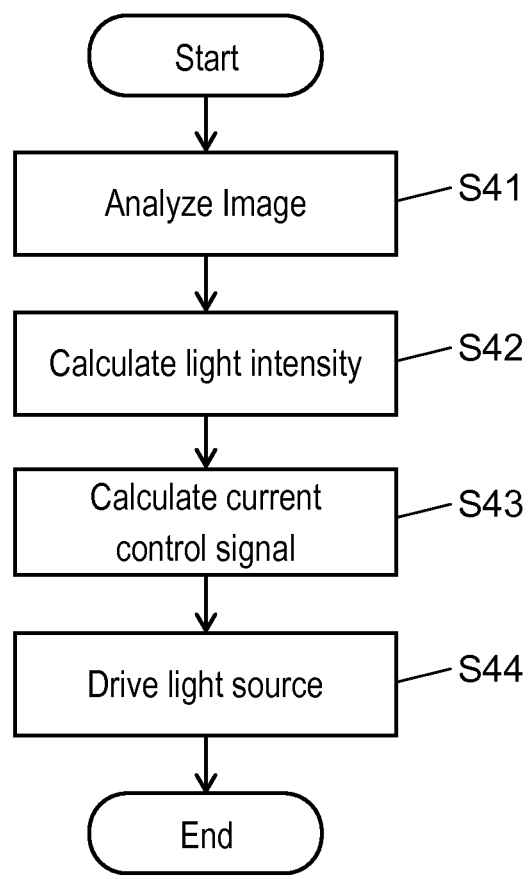
FIG. 4 is a flow chart showing steps of light intensity control by the controller 300 according to the first exemplary embodiment.

FIG. 3 is a block diagram illustrating a configuration of the controller 300. Further, FIG. 4 is a flow chart showing steps of the control of the light intensity of light source 130 by controller 300. In the following description, the control of the light intensity of the image by projector 100 will be described with reference to FIG. 3 and FIG. 4.

Controller 300 includes image signal analyzer 200, light intensity calculator 210, light source controller 220, light source driver 230, image signal controller 250, video display element driver 260, and color wheel driver 270.

The image signal to be input to controller 300 may be a image signal previously provided in an internal memory (not depicted) or the like of projector 100, or a image signal transmitted via an external network or the like and temporarily stored in a buffer memory (not depicted) or the like.

Image signal analyzer 200 analyzes the image signal frame by frame (S41). Image signal analyzer 200 extracts chroma saturation, brightness, hue, and the like from the input image signal for each frame, and outputs as image analyzed information. Image signal analyzer 200 calculates an average value of chroma saturation for pixels included in a single frame of the image signal, and uses the average value as the chroma saturation of this image signal. This also applies to brightness, hue, and other information. In addition, image signal analyzer 200 outputs the input image signal to image signal controller 250 as it is.

Light intensity calculator 210 calculates the light intensity of light source 130 assigned to each segment of color wheel 150 based on the image analyzed information extracted from image signal analyzer 200 (S42). When projector 100 forms the image based on the image signal of a single frame, light intensity calculator 210 calculates an amount of the light intensity at the timing at which the light flux from light source 130 enters into each segment of color wheel 150.

Light intensity calculator 210 calculates the light intensity to be entered into the second region based on the image analyzed information obtained from the image signal. Specifically, when the chroma saturation of the image signal is low, light intensity calculator 210 increases the brightness of the image by relatively increasing the light intensity to be entered into the white segment (hereinafter also simply referred to as the light intensity of the white segment; this applies to the other segments), and relatively decreasing the light intensities of the red, the green, and the blue segments. Further, conversely, when the chroma saturation of the image signal is high, light intensity calculator 210 increases vividness of the image by relatively decreasing the light intensity of the white segment, and by increasing the light intensities of the red, green, blue segment.

Moreover, light intensity calculator 210 controls a color temperature of first transmitted light so that a color temperature of a light flux obtained by combining the first transmitted light generated after transmitting through the first region and second transmitted light generated after transmitting through the second region (combined light for the all segments) to be a predetermined target color temperature. In this context, the first transmitted light refers to combined light obtained by combining the light of the colors generated after passing through the segments in the first region, that is, the red segment, the green segment, and the blue segment. The second transmitted light refers to color light obtained after passing through the white segment in the second region (white color light). Further, the color temperature refers to a temperature of a perfectly black body when the black body emits light of the corresponding color. The color temperature indicates a value representing relative intensity of bluish-violet light and red color light included in the light source that emits light of a certain color. A color temperature of the second transmitted light is 6000 K, which is the same as the color temperature of the light flux emitted from light source 130. According to this exemplary embodiment, the target color temperature is 6000 K, which is the same as the color temperature of the second transmitted light.

Light intensity calculator 210 adjusts a color temperature of the first transmitted light by controlling a ratio between the light intensities of the light of the colors that constitute the first transmitted light so that the color temperature of the combined light of all segments becomes the target color temperature. Light intensity calculator 210 calculates the light intensity of light source 130 assigned for each segment, and outputs the calculated result as a light source control signal to light source controller 220. The calculation of the light intensity of each segment by light intensity calculator 210 will be described later in detail.

Light source controller 220 calculates the light source current to be applied to light source 130 in order to cause light source 130 to emit light with the light intensity calculated by light intensity calculator 210 (S43). Light intensity of light source 130 assigned to each segment is calculated based on an angle of the segment of one of the four colors including red, green, blue, and white in color wheel 150, light output characteristics (Injection current-Light output and I/L characteristic) for the light source current applied to light source 130, and the like.

Figure 5:
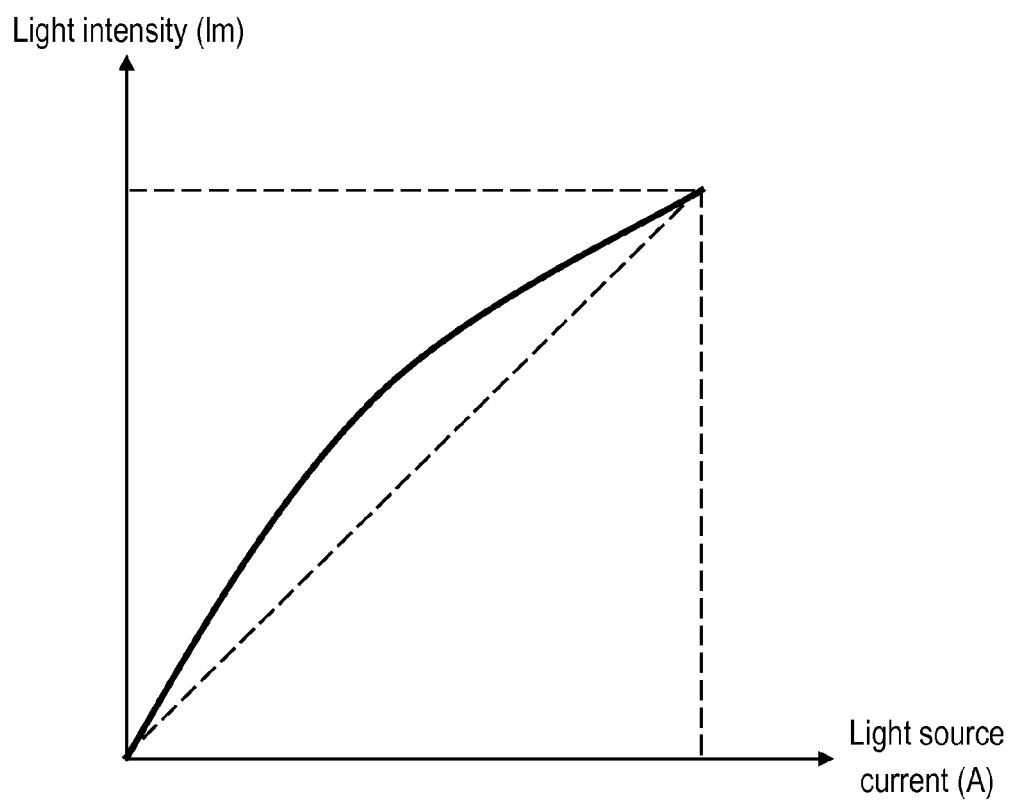
FIG. 5 is a graphical chart showing one example of an I/L characteristic of a light source 130 according to the first exemplary embodiment.

Next, the I/L characteristic for the light source current of light source 130 will be described with reference to FIG. 5. FIG. 5 is a graphical chart showing one example of the I/L characteristic of light source 130. Referring to FIG. 5, the vertical axis indicates the light intensity (lm), and the horizontal axis indicates the light source current (A). FIG. 5 shows a relation between the light source current (A) applied to light source 130 and the light intensity (lm) output from light source 130. The relation between the light source current (A) applied to light source 130 and the light intensity (lm) output from light source 130 is not proportional, and showing a function in which the light intensity (lm) is convexed upwardly with respect to the light source current (A).

In this manner, light source controller 220 calculates the light source current (A) considering the I/L characteristic of light source 130 so as to cause light source 130 to emit light with the light intensity assigned for each segment. Light source controller 220 receives the light source control signal output from light intensity calculator 210. Light source controller 220 generates a current control signal for generating the current to be supplied to light source 130 based on the light source control signal, and outputs the generated current control signal to light source driver 230.

Light source driver 230 applies the light source current to light source 130 based on the current control signal from light source controller 220. With this, the light intensity of the light of the colors for each of the red, the green, the blue, and the white segment of light source 130 is controlled frame by frame (S44).

1-3-2. Correction of Image Signal and Formation of Image

As described above, the ratio of the light intensities of the corresponding segments changes per frame by controlling the light intensity of light source 130. As a result, the vividness of the image may also change over time and may become conspicuous. Therefore, projector 100 may reduce such a change by correcting the image signal. In the following, a process for correcting the image signal will be described.

Image signal controller 250 corrects the image signal based on the image signal output from image signal analyzer 200, and the light source control signal calculated by light intensity calculator 210.

When the light intensities for the red, the green, and the blue segment are low as compared to the light intensity for the white segment, vividness of halftone pixels in which the white segment emits light in the image may often be reduced and shown washed out. In such a case, image signal controller 250 improves quality of the image by performing chroma saturation enhancement correction to the image signal. For example, in order to avoid a situation in which the image is shown washed out when a value obtained by subtracting an average value of the light intensities for the red, the green, and the blue segment from the light intensity for the white segment is equal to or greater than a predetermined value, image signal controller 250 performs correction of increasing chroma saturation by applying a chroma saturation enhancement correction function to the image signal.

Figure 6:
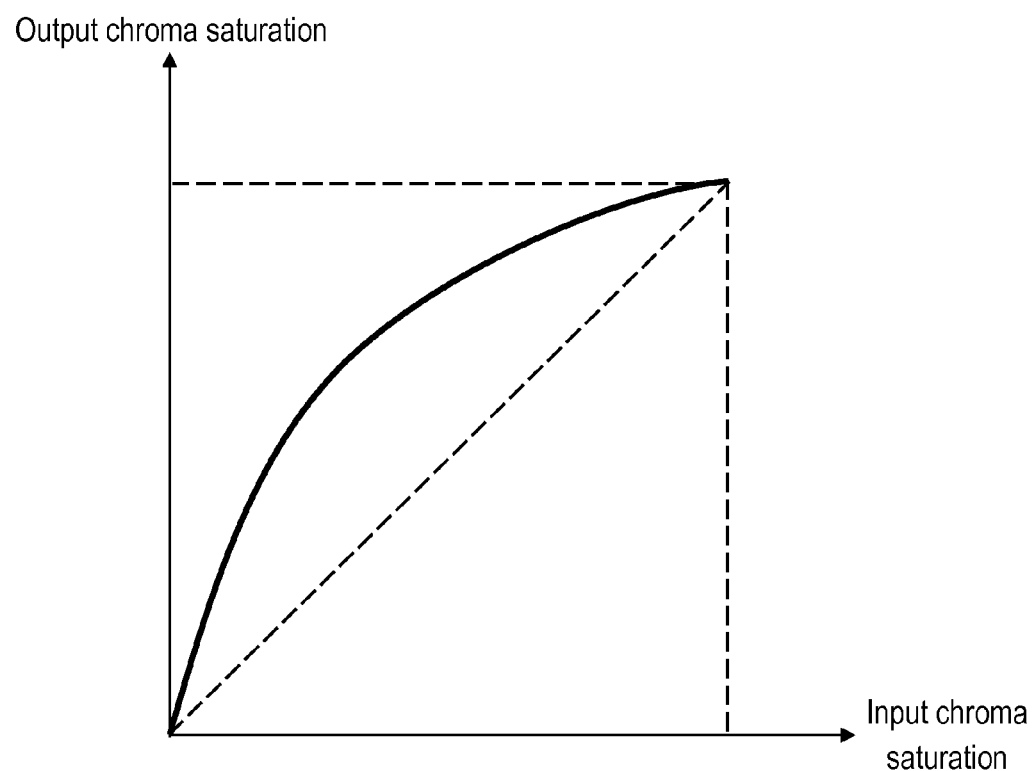
FIG. 6 is a graphical chart showing one example of a chroma saturation enhancement correction function according to the first exemplary embodiment.

FIG. 6 is a graphical chart showing one example of the chroma saturation enhancement correction function applied by image signal controller 250 of projector 100 in the correction process. Referring to FIG. 6, the vertical axis indicates output chroma saturation, and the horizontal axis indicates input chroma saturation. This chart indicates that when the chroma saturation takes a value, for example, ranging from 0 to 255, an amount of chroma saturation is particularly increased for halftone chroma saturation on the order of 128. Image signal controller 250 applies the correction function taking chroma saturation of each pixel of the image signal as the input chroma saturation to obtain the output chroma saturation, and takes the output chroma saturation as the chroma saturation of this pixel. With this, even when the light intensities for the red, the green, and the blue segment are low as compared to the light intensity for the white segment, it is possible to reduce the possibility that the image is shown washed out, as the correction of increasing the chroma saturation for the image signal is performed.

When the light intensities for the red, the green, and the blue segment are high as compared to the light intensity for the white segment, halftone pixels in which the white segment does emit light in the image may often be too vivid. In such a case, image signal controller 250 improves quality of the image by performing chroma saturation reduction correction to the image signal. For example, in order to avoid a situation in which the image is shown too vividly when a value obtained by subtracting the light intensity for the white segment from the average value of the light intensities for the red, the green, and the blue segment is equal to or greater than the predetermined value, image signal controller 250 performs correction of reducing chroma saturation by applying a chroma saturation reduction correction function to the image signal.

Figure 7:
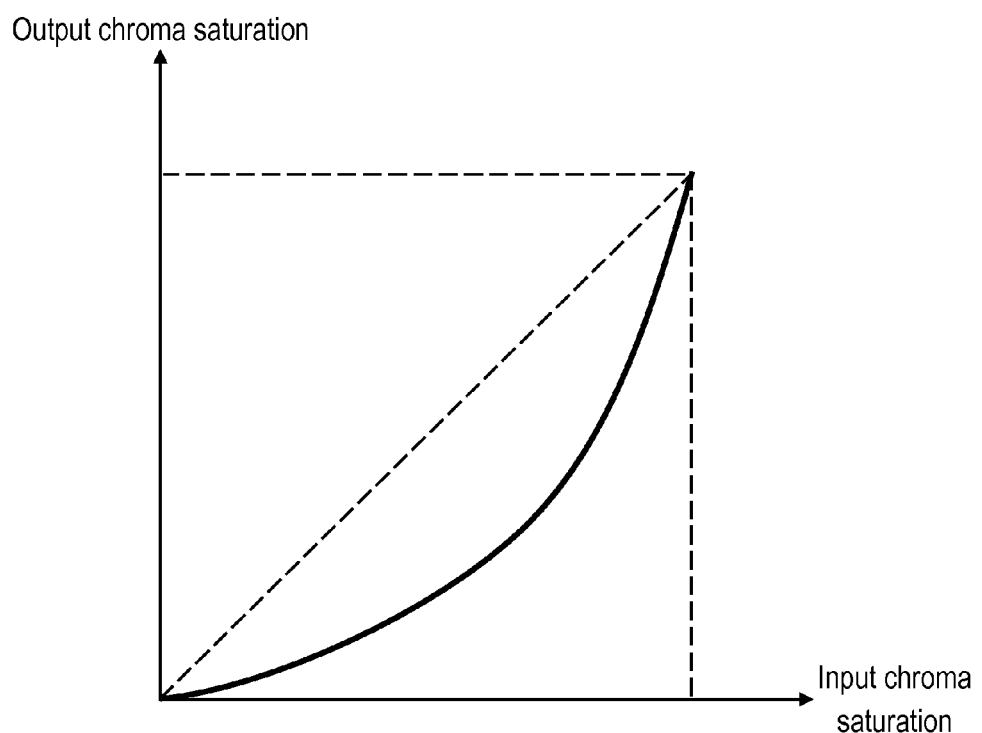
FIG. 7 is a graphical chart showing one example of a chroma saturation reduction correction function according to the first exemplary embodiment.

FIG. 7 is a graphical chart showing one example of the chroma saturation reduction correction function applied by image signal controller 250 of projector 100 in the correction process. Referring to FIG. 7, the vertical axis indicates the output chroma saturation, and the horizontal axis indicates the input chroma saturation. This chart indicates that when the chroma saturation takes a value, for example, ranging from 0 to 255, an amount of chroma saturation is particularly reduced for the halftone chroma saturation on the order of 128. Image signal controller 250 applies the correction function taking chroma saturation of each pixel of the image signal as the input chroma saturation to obtain the output chroma saturation, and takes the output chroma saturation as the chroma saturation of this pixel. With this, even when the light intensities for the red, the green, and the blue segment are high as compared to the light intensity for the white segment, it is possible to reduce the possibility that the image is shown too vividly, as the correction of reducing the chroma saturation for the image signal is performed.

When the light intensities for the segments do not satisfy either of the above conditions, image signal controller 250 may output the image signal to the video display element driver 260 without correction.

Video display element driver 260 receives the image signal corrected by image signal controller 250. Video display element driver 260 outputs a rotation control signal to color wheel driver 270. The rotation control signal is information relating to a rotational speed of color wheel 150. Color wheel driver 270 rotates color wheel 150 according to the rotation control signal. Color wheel driver 270 detects a rotation angle (phase) of color wheel 150 using a sensor such as a photoreflector (not depicted), and transmits this angle as position information to the video display element driver 260. Video display element driver 260 detects displacement of the rotational speed and the phase of color wheel 150 based on the position information of color wheel 150 and its amount of change, generates the rotation control signal for obtaining a desired rotational speed and a desired phase that are synchronous with the image signal, and outputs the generated signal to color wheel driver 270.

Further, video display element driver 260 outputs a image display control signal to DMD 180 at timing synchronous with the corrected image signal based on the corrected image signal.

DMD 180 modulates the light emitted from light source 130 to form the image. DMD 180 receives the image display control signal, and reflects light according to the light emitted from each segment and entering into DMD 180. As described above, the image is formed based on the image signal.

1-3-3. Light Source Current Control

Figure 8:
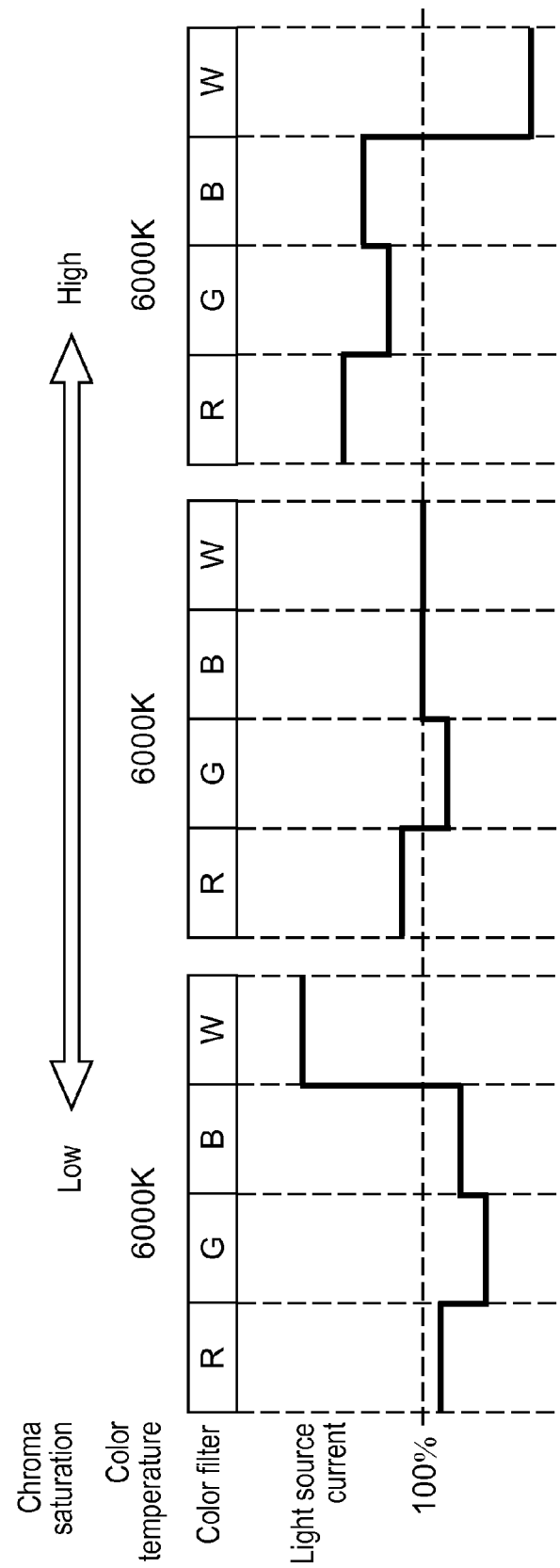
FIG. 8 is a chart showing one example of light source current control according to the first exemplary embodiment.

FIG. 8 is a chart showing one example of light source current control in the light intensity control by projector 100 according to this exemplary embodiment.

FIG. 8 shows the light source current to be applied to light source 130 in order to make the light intensity of the light entering to the red, the green, the blue, and the white segment be a desired light intensity. The light source current in the figure is a relative value taking a predetermined reference current (A) to be applied to light source 130 as 100%. FIG. 8 shows setting of the light source currents when the chroma saturation of the image signal is relatively low, setting of the light source currents when the chroma saturation is medium, and setting of the light source currents when the chroma saturation is relatively high respectively on the left side, in the center, and on the right side of the figure. The light source current to be applied to light source 130 in order to make the light intensity for each segment be the desired light intensity is also simply referred to as the light source current for each segment.

As used herein, the low chroma saturation indicates that the chroma saturation of the image signal is lower than a threshold value TH1. The high chroma saturation indicates that the chroma saturation of the image signal is equal to or higher than a threshold value THs2 (where THs2>THs1). The medium chroma saturation indicates that the chroma saturation of the image signal is equal to or higher than the threshold value THs1 and lower than the threshold value THs2. Further, the low brightness indicates that the brightness of the image signal is lower than a threshold value THv1. The high brightness indicates that the brightness of the image signal is equal to or higher than a threshold value THv2 (where THv2>THv1). The medium brightness indicates that the brightness of the image signal is equal to or higher than the threshold value THv1 and lower than the threshold value THv2. The threshold value THv1 is one example of a fourth threshold value. The threshold value THv2 is one example of a first threshold value. The threshold value THs1 is one example of a second threshold value. The threshold value THs2 is one example of a third threshold value.

Projector 100 according to this exemplary embodiment restricts the light source current to be applied to light source 130 in order to reduce consumed electrical power of light source 130 to be equal to or smaller than a predetermined value. Specifically, light intensity calculator 210 controls an average value of the light source currents for all of the segments including the red, the green, the blue, and the white segment to be equal to or lower than a reference current. Further, light intensity calculator 210 controls a ratio between the first transmitted light and the second transmitted light according to the chroma saturation and/or the brightness of the image signal. Moreover, light intensity calculator 210 calculates the light intensity entering into each segment in the first region so as to make the color temperature of the combined light for all the segments be the target color temperature. However, according to this exemplary embodiment, the target color temperature is equal to the color temperature of the second transmitted light. In other words, light intensity calculator 210 controls the color temperature of the first transmitted light to be 6000 K when the color temperature of the second transmitted light is 6000 K.

Light intensity calculator 210 controls the light intensity entering into each segment, in turn, the light intensity of the light of the color emitted from each segment, by controlling the light source current for each of the red, the green, and the blue segment in the first region. With this, it is possible to control the light intensity and the color temperature of the first transmitted light obtained by combining the light emitted from the segments. Next, specific examples of the control of the light intensity for each segment according to the chroma saturation and/or the brightness of the image signal will be described.

When the chroma saturation of the image signal is medium, light intensity calculator 210 calculates the light source currents as shown in the center of FIG. 8. First, light intensity calculator 210 takes the light source current of the white segment to be the reference current (100%). At this time, light intensity calculator 210 calculates the light intensity to be entered into each segment in the first region such that the color temperature of the combined light for all of the segments becomes the target color temperature within the restriction of the consumed electrical power of light source 130. In other words, light intensity calculator 210 adjusts the light source currents of the red, the green, and the blue segment such that the color temperature of the first transmitted light becomes equal to 6000 K, which is the color temperature of the white segment, within the restriction of the consumed electrical power. For example, light intensity calculator 210 sets the light source current for the red segment to be higher than 100%, the light source current for the green segment to be lower than 100%, and the light source current for the blue segment to be 100%.

By light intensity calculator 210 setting the ratio between the light source currents for the red, the green, and the blue segment as shown in the figure, it is possible to make the color temperature of the first transmitted light be 6000 K. Further, as the color temperature of the second transmitted light is 6000 K, the color temperature of the combined light of the first transmitted light and the second transmitted light, that is, the combined light of all the segments also becomes 6000 K. Therefore, when the light of all the segments is projected for the white pixel in the image signal, the color temperature of the white color light corresponding to this pixel becomes 6000 K.

When the chroma saturation of the image signal is low and the brightness of the image signal is high (first condition), light intensity calculator 210 calculates the light source currents as shown on the left side of FIG. 8. Light intensity calculator 210 controls to increase the brightness of the image in order to appropriately display the image based on the image signal whose brightness is high. Specifically, light intensity calculator 210 increases the light source current for white segment to be more than the reference current, in order to increase the brightness of the image. In other words, when it is determined that the first condition is satisfied, light intensity calculator 210 calculates the light intensity of the light entering into the second region to be greater than that in a case in which it is not determined that the first condition is satisfied.

As the light source current for the white segment is made higher than the reference current, light intensity calculator 210 decreases the average value of the light source currents for the red, the green, and the blue segment to be lower than the reference current in order to reduce the consumed electrical power of light source 130 to be equal to or smaller than the predetermined value. At this time, similarly to the case in which the chroma saturation is medium, light intensity calculator 210 calculates the light intensity of the light entering into each segment of the first region such that the color temperature of the combined light for all of the segments becomes the target color temperature. Specifically, light intensity calculator 210 decreases the light source currents as a whole while maintaining the color temperature of the first transmitted light from the red, the green, and the blue segment to be 6000 K. In other words, light intensity calculator 210 decreases the light source currents for the red, the green, and the blue segment until the average value of the light source currents for all of the segments becomes equal to or lower than the reference current, while maintaining the ratio between the light source currents of the red, the green, and the blue segment. With this, when the chroma saturation of the image signal is low and the brightness of the image signal is high, projector 100 may control the color temperature of the combined light for all of the segments to be 6000 K, while ensuring the brightness by the white segment.

On the other hand, when the chroma saturation of the image signal is high regardless of the brightness of the image signal (second condition), light intensity calculator 210 calculates the light source currents as shown on the right side of FIG. 8. Light intensity calculator 210 controls to increase the vividness of the image in order to appropriately display the image based on the image signal whose chroma saturation is high. Specifically, light intensity calculator 210 first decreases the light source current for white segment to be more than the reference current, in order to increase the vividness of the image. In other words, when it is determined that the second condition is satisfied, light intensity calculator 210 calculates the light intensity of the light entering into the second region to be smaller than that in a case in which it is not determined that the second condition is satisfied.

As the light source current for the white segment is made lower than the reference current, light intensity calculator 210 may increase the average value of the light source currents for the red, the green, and the blue segment to be higher than the reference current within the range in which the average light source current for all of the segments is equal to or lower than the reference current. At this time, similarly to the case in which the chroma saturation is medium, light intensity calculator 210 calculates the light intensity of the light entering into each segment of the first region such that the color temperature of the combined light for all of the segments becomes the target color temperature. Specifically, light intensity calculator 210 maintains the ratio between the light source currents for the red, the green, and the blue segment in order to maintain the color temperature of the first transmitted light to be 6000 K.

With this, when the chroma saturation of the image signal is high, projector 100 may control the color temperature of the combined light for all of the segments to be 6000 K, while ensuring the vividness by the red, the green, and the blue segment.

When both of the brightness and the chroma saturation of the image signal are low (third condition), light intensity calculator 210 may control in the same manner as in the case in which the chroma saturation is high regardless of the brightness.

Based on the light source current control described above, projector 100 according to this exemplary embodiment may calculate the best suited light source current based on the image signal and make the color temperature of the image constant.

1-4. Effects and Such

As described above, according to this exemplary embodiment, projector 100 controls the light source current according to the input image signal. With this, projector 100 may project the image having the brightness and the vividness according to the image signal while reducing the consumed electrical power of light source 130 to be equal to or smaller than the predetermined value and controlling the color temperature of the white color light constant regardless of the input image signal. Thus, projector 100 may improve the quality of the image.

In this exemplary embodiment, the case in which both of the target color temperature and the color temperature of the second transmitted light are 6000 K is described. However, in this exemplary embodiment, the color temperatures of the target color temperature and the second transmitted light may take any value such as 5000 K or 7000 K, as long as the both color temperatures are the same.

Second Exemplary Embodiment 2-1. General Outline

In the first exemplary embodiment, the case in which the target color temperature is equal to the color temperature of the second transmitted light, that is the color temperature of the white color light for the white segment. Projector 100 according to this exemplary embodiment is the same as that in the first exemplary embodiment in the basic configuration, but different from the first exemplary embodiment in that in the light source current control, the target color temperature of the first transmitted light is different form the color temperature of the second transmitted light. In the following description, the light source current control of projector 100 according to this exemplary embodiment will be described.

2-2. Output Operation of Image 2-2-1. Light Source Current Control

Figure 9:
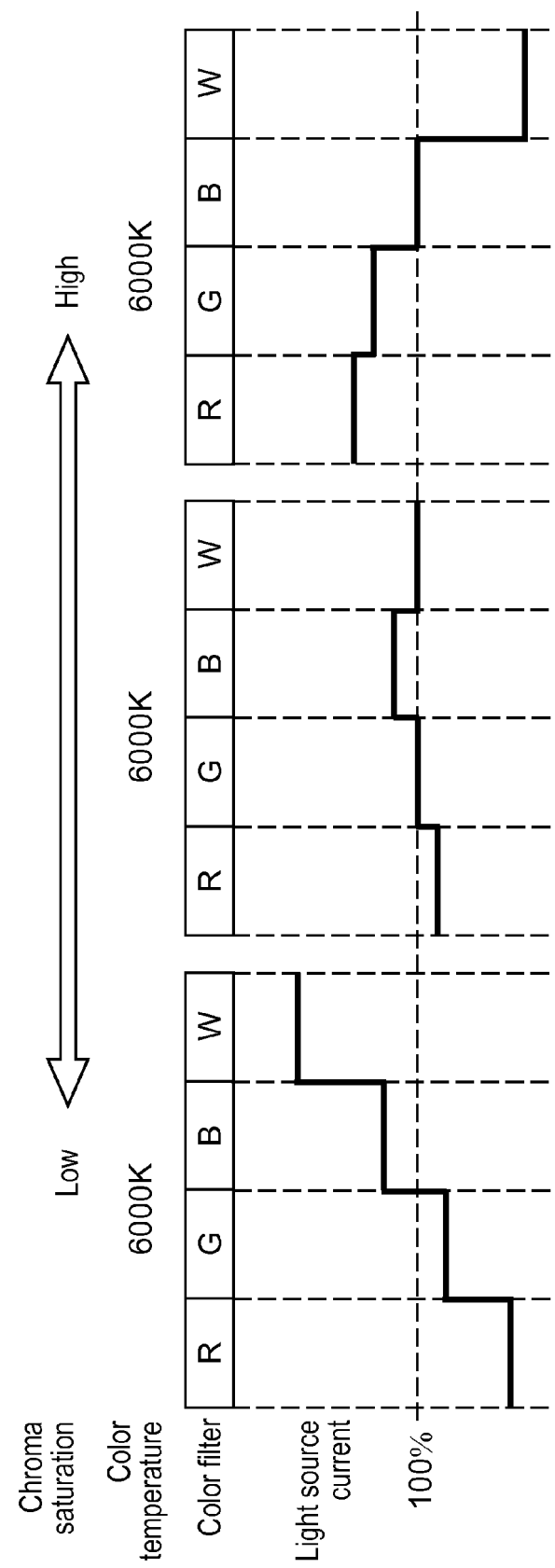
FIG. 9 is a chart showing one example of light source current control according to a second exemplary embodiment.

FIG. 9 is a chart showing one example of the light source current control in the light intensity control by projector 100 according to this exemplary embodiment. Similarly to FIG. 8, FIG. 9 shows a magnitude of the light source current for each segment in a ratio to the reference current.

Light intensity calculator 210 calculates the light intensity entering into each segment in the first region so as to make the color temperature of the combined light for all the segments be the target color temperature. However, according to this exemplary embodiment, the target color temperature is different from the color temperature of the second transmitted light. Hereinafter, a case in which the target color temperature is 6000 K, and the color temperature of the second transmitted light, that is, the color temperature of the white color light for the white segment is lower than 6000 K (e.g., 5500 K) will be described.

When the chroma saturation of the image signal is medium, light intensity calculator 210 calculates the light source currents as shown in the center of FIG. 9. Specifically, similarly to the first exemplary embodiment, light intensity calculator 210 takes the light source current of the white segment to be the reference current (100%), and controls an entire color temperature to be the target color temperature by controlling the light source current of the first transmitted light within the restriction of the consumed electrical power of light source 130. However, the color temperature of the second transmitted light is lower than 6000 K. Therefore, in order to make the color temperature of the combined light for all the segments to be 6000 K as the target color temperature, the light intensity calculator 210 controls the color temperature of the first transmitted light to be higher than that in the first exemplary embodiment (6000 K) (e.g., 6500 K). Specifically, the light intensity calculator 210 sets the light source current for the red segment to be lower than that in the first exemplary embodiment, and the light source current for the blue segment to be higher than that in the first exemplary embodiment. In this manner, it is possible to make the color temperature of the combined light for all the segments to be 6000 K.

When the chroma saturation of the image signal is low and the brightness of the image signal is high (first condition), light intensity calculator 210 calculates the light source currents as shown on the left side of FIG. 9. Light intensity calculator 210 controls to increase the brightness of the image in order to appropriately display the image based on the image signal whose brightness is high. Specifically, light intensity calculator 210 increases the light source current for white segment to be more than the reference current, in order to increase the brightness of the image. In other words, when it is determined that the first condition is satisfied, light intensity calculator 210 calculates the light intensity of the light entering into the second region to be greater than that in a case in which it is not determined that the first condition is satisfied.

As the light source current for the white segment is made higher than the reference current, light intensity calculator 210 decreases the average value of the light source currents for the red, the green, and the blue segment to be lower than the reference current in order to reduce the consumed electrical power of light source 130 to be equal to or smaller than the predetermined value. Then, in order to make the color temperature of the combined light for all the segments be the target color temperature, light intensity calculator 210 controls to further increase the color temperature of the first transmitted light (e.g., 7000 K) as compared to the case in which the chroma saturation is medium. Specifically, light intensity calculator 210 further increases the light source current for the blue segment by relatively reducing the light source current for the red segment as compared to the case in which the chroma saturation is medium, while decreasing the average value of the light source currents for the red, the green, and the blue segment to be lower than the reference current.

With this, when the chroma saturation of the image signal is low and the brightness of the image signal is high, projector 100 may control the color temperature of the white color light for all the segments to be 6000 K while ensuring the brightness by the white segment.

On the other hand, when the chroma saturation of the image signal is high regardless of the brightness of the image signal (second condition), light intensity calculator 210 calculates the light source currents as shown on the right side of FIG. 9. Light intensity calculator 210 controls to increase the vividness of the image in order to appropriately display the image based on the image signal whose chroma saturation is high. Specifically, light intensity calculator 210 first decreases the light source current for white segment to be more than the reference current, in order to increase the vividness of the image. In other words, when it is determined that the second condition is satisfied, light intensity calculator 210 calculates the light intensity of the light entering into the second region to be smaller than that in a case in which it is not determined that the second condition is satisfied.

As the light source current for the white segment is made lower than the reference current, light intensity calculator 210 may increase the average value of the light source currents for the red, the green, and the blue segment to be higher than the reference current within the range in which the average light source current for all of the segments is equal to or lower than the reference current. Then, in order to make the color temperature of the combined light for all the segments be the target color temperature, light intensity calculator 210 controls to further decrease the color temperature of the first transmitted light (e.g., 6200 K) as compared to the case in which the chroma saturation is medium. Specifically, light intensity calculator 210 further decreases the light source current for the blue segment by relatively increasing the light source current for the red segment as compared to the case in which the chroma saturation is medium, while increasing the average value of the light source currents for the red, the green, and the blue segment to be lower than the reference current.

With this, when the chroma saturation of the image signal is high, projector 100 may control the color temperature of the white color light for all of the segments to be 6000 K, while ensuring the vividness by the red, the green, and the blue segment.

2-3. Effect

As described above, according to this exemplary embodiment, projector 100 controls the light source current according to the image signal to be input. With this, projector 100 may project the image having the brightness and the vividness according to the image signal while reducing the consumed electrical power of light source 130 to be equal to or smaller than the predetermined value and controlling the color temperature of the white color light constant regardless of the image signal to be input. Thus, projector 100 may improve the quality of the image.

Third Exemplary Embodiment 3-1. General Outline

Projector 100 according to a third exemplary embodiment is the same as that in the second exemplary embodiment in the basic configuration, but light intensity calculator 210 performs calculation of the light intensity so that the brightness of the second transmitted light corresponds to target brightness, in addition to the control of the color temperature according to the second exemplary embodiment. Specifically, light intensity calculator 210 controls brightness of the combined light for all the segments to be constant by changing the light source currents for all the segments while maintaining the ratio between the light source currents. In particular, by making the brightness of the combined light for all the segments when the chroma saturation of the image signal is high correspond to the target brightness, it is possible to reduce the consumed electrical power of projector 100 as compared to the second exemplary embodiment.

3-2. Output Operation of Image 3-2-1. Light Source Current Control

Figure 10:
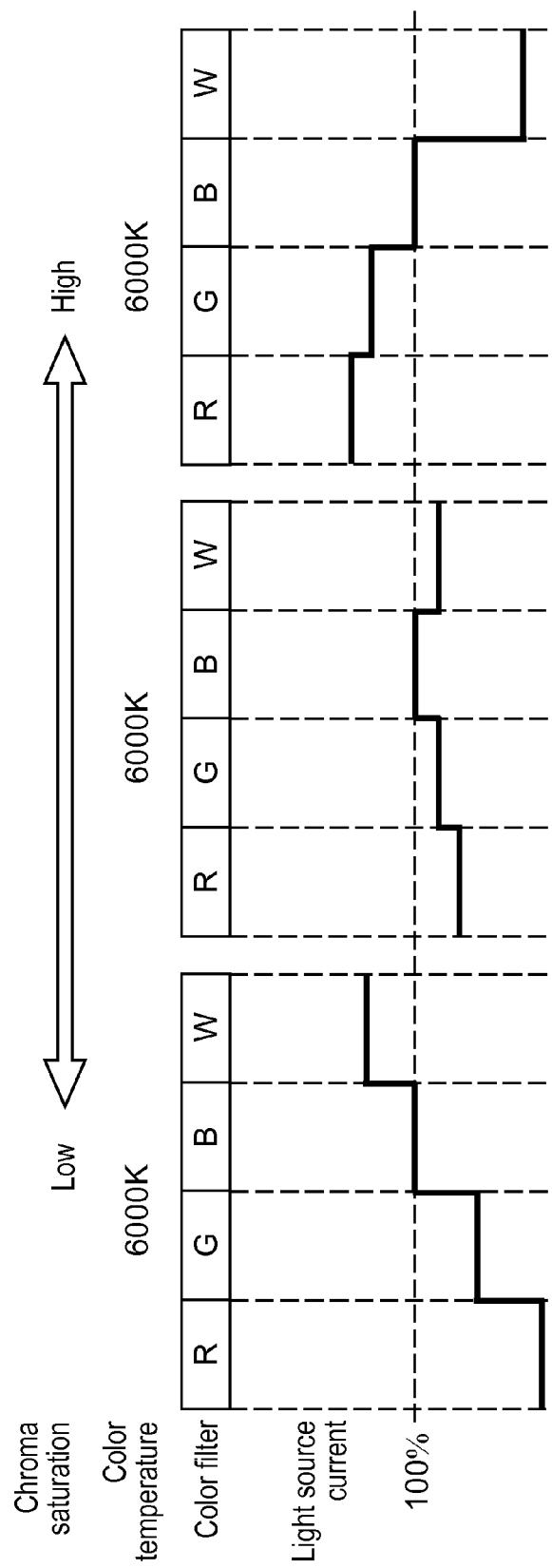
FIG. 10 is a chart showing one example of light source current control according to a third exemplary embodiment.

FIG. 10 is a chart showing one example of the light source current control in the light intensity control by projector 100 according to this exemplary embodiment. Similarly to FIG. 8 and FIG. 9, FIG. 10 shows a magnitude of the light source current for each segment in a ratio to the reference current.

Similarly to the second exemplary embodiment, in this exemplary embodiment, the case in which the target color temperature is 6000 K, and the color temperature of the second transmitted light, that is, the color temperature of the white color light for the white segment is lower than 6000 K (e.g., 5500 K) will be described.

When the chroma saturation of the image signal is high regardless of the brightness of the image signal (second condition), light intensity calculator 210 calculates the light source currents in the same manner as in the second exemplary embodiment. Shown on the right side of FIG. 10 is the same as what is shown on the right side of FIG. 9. In this manner, when the chroma saturation of the image signal is high, projector 100 may control the color temperature of the white color light for all of the segments to be 6000 K, while ensuring the vividness by the red, the green, and the blue segment. The brightness of the combined light for all the segments when the chroma saturation of the image signal is high is taken as the target brightness.

Here, when the chroma saturation of the image signal is high, projector 100 decreases the light intensity of the white segment and increases the light intensities of the red, the green, and the blue segment. On the other hand, the light intensity of the white segment most contributes to the brightness of the combined light for all the segments. For example, when the light intensity of the white segment is low, the brightness of the combined light for all the segments also becomes low. Therefore, the brightness of the combined light for all the segments when the chroma saturation of the image signal is high becomes low as compared to the case in which the chroma saturation of the image signal is low or medium. In other words, by setting the target brightness as described above, the brightness of the combined light for all the segments may correspond to the target brightness by decreasing by being decreased when the chroma saturation of the image signal is low or medium.

When the chroma saturation of the image signal is medium, light intensity calculator 210 first calculates the light source currents as shown in the center of FIG. 9, similarly to the second exemplary embodiment. At this time, the color temperature of the combined light for all of the segments is 6000 K. Next, the light intensity calculator 210 controls the light source current for each segment so that the brightness of the combined light for all the segments becomes equal to the target brightness. As described above, by performing the control similarly to the second exemplary embodiment when the chroma saturation of the image signal is medium, the brightness of the combined light for all the segments becomes higher than the target brightness. Therefore, the brightness is made correspondent to the target brightness without changing the color temperature by decreasing the ratio between the light source currents for the segments. As a result, each light source current is as shown in the center of FIG. 10.

When the chroma saturation of the image signal is low and the brightness of the image signal is high (first condition), light intensity calculator 210 first calculates the light source currents as shown on the left side of FIG. 9, similarly to the second exemplary embodiment. At this time, the color temperature of the combined light for all the segments is 6000 K. Next, similarly to the case in which the chroma saturation is medium according to this exemplary embodiment, the light intensity calculator 210 controls the light source current for each such that the brightness of the combined light for all the segments becomes equal to the target brightness. As a result, each light source current is as shown on the left side of FIG. 10.

3-3. Effects and Such

As described above, according to this exemplary embodiment, projector 100 controls the light source current according to the image signal to be input. With this, projector 100 may project the image having the brightness and the vividness according to the image signal while reducing the consumed electrical power of the light source 130 to be equal to or smaller than the predetermined value and controlling the color temperature and the brightness of the white color light constant regardless of the image signal to be input. Thus, projector 100 may reduce flickers due to the change in the brightness and improve the quality of the image.

Further, when the chroma saturation of the image signal is low or medium, projector 100 controls to decrease the light source current so as to make the brightness constant. Accordingly, projector 100 may reduce the consumed electrical power as compared to the second exemplary embodiment.

In this exemplary embodiment, the light source current is controlled taking the brightness of the combined light for all the segments when the second condition is satisfied as the target brightness. However, the target brightness is not limited to this, and brightness set for a case in which a different condition is satisfied, or specific brightness that has been previously set may be taken as the target brightness.

Reference Example 4-1. General Outline

According to the first to the third exemplary embodiments, the case in which the target color temperature is constant regardless of the chroma saturation of the image signal is described. In this reference example, a case in which projector 100 changes the target color temperature dynamically will be described. Light intensity calculator 210 controls the brightness and the vividness according to the image desired to be displayed by dynamically changing the target color temperature of the combined light for all the segments according to the image signal.

4-2. Output Operation of Image 4-2-1. Light Source Current Control

Figure 11:
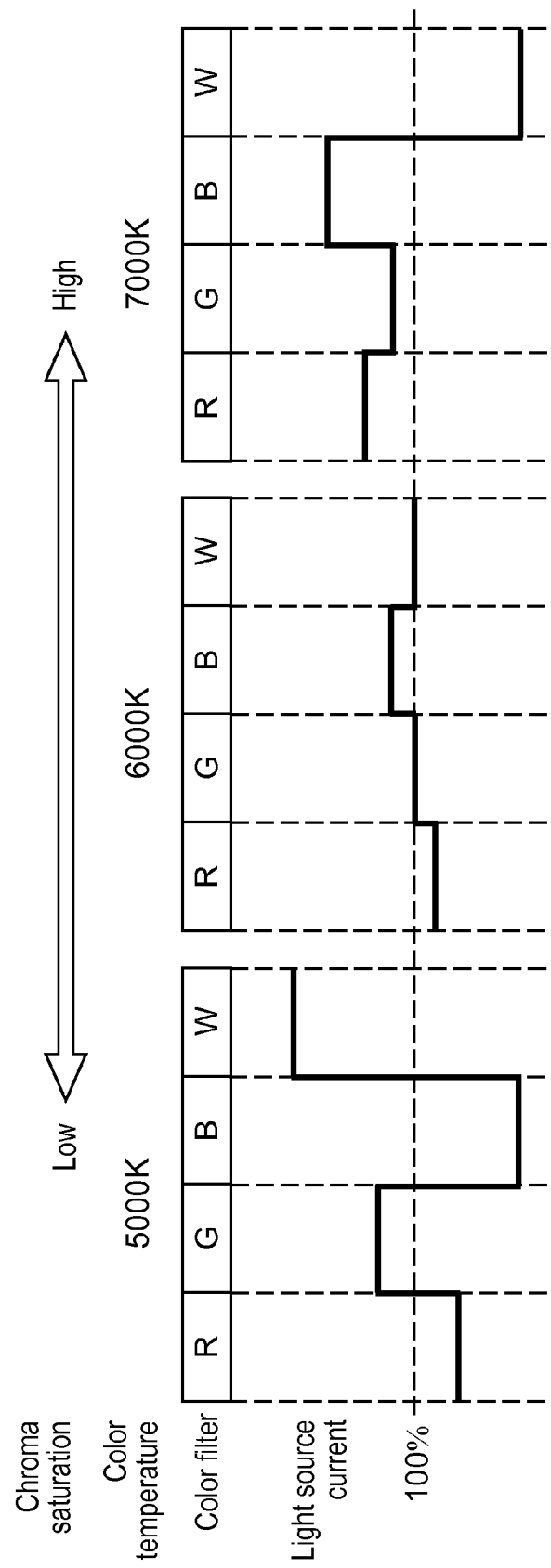
FIG. 11 is a chart showing one example of light source current control according to a reference example.

FIG. 11 is a chart showing one example of the light source current control in the light intensity control by projector 100 according to the reference example. Similarly to FIG. 8 to FIG. 10, FIG. 11 shows a magnitude of the light source current for each segment in a ratio to the reference current.

In the following, a case in which the target color temperature changes dynamically from 5000 K to 7000 K will be described.

Figure 12:
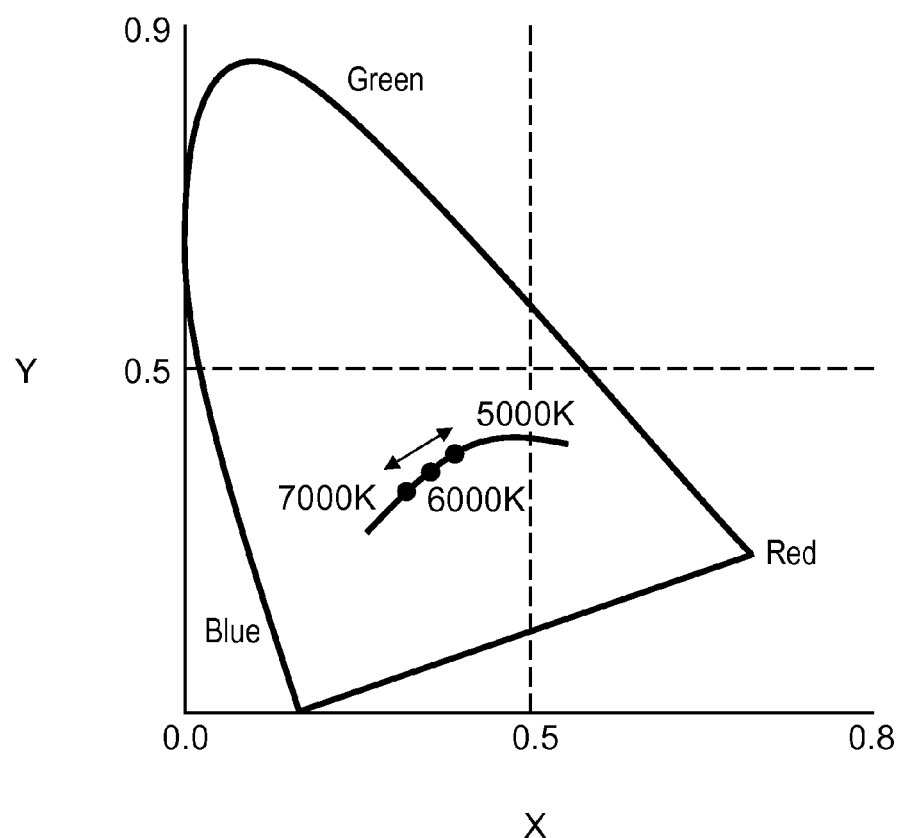
FIG. 12 is an illustrative diagram of a color temperature according to a reference example.

FIG. 12 is an illustrative diagram of a color temperature according to this reference example. There is shown a change of coordinates in a chromaticity diagram when the color temperature of the white color light changes from 5000 K to 7000 K.

When the chroma saturation of the image signal is low and the brightness of the image signal is high (first condition), light intensity calculator 210 calculates the light source currents as shown on the left side of FIG. 11 as control in a brightness enhancement mode.

In the brightness enhancement mode, light intensity calculator 210 controls the light source currents for the red, the green, and the blue segment so as to enhance the brightness of the first transmitted light and the second transmitted light. In other words, light intensity calculator 210 controls to increase the brightness of the image in order to appropriately display the image based on the image signal whose brightness is high.

Next, properties of light will be described. The green color light is recognized by the user to be brighter than the red color light and the blue color light. The blue color light is recognized by the user to be darker than the red color light and the green color light.

Accordingly, in order to improve the brightness of the image recognized by the user, light intensity calculator 210 increases the light source current for the green segment to be higher than those for the red and the blue segment, and decreases the light source current for the blue segment to be lower than those for the red and the green segment. Further, light intensity calculator 210 increases the light source current for the white segment to be higher than the reference current. As the ratio between the light source currents for the red, the green, and the blue segment changes, the color temperature of the first transmitted light changes. Light intensity calculator 210 takes 5000 K as the target color temperature at this time and sets the light source current for each segment.

In this manner, by controlling the light source current for each segment in the brightness enhancement mode, projector 100 according to this reference example makes the color temperature of the combined light for all the segments be 5000 K. In addition, projector 100 may ensure the brightness of the image by this control.

On the other hand, when the chroma saturation of the image signal is high regardless of the brightness of the image signal (second condition), light intensity calculator 210 calculates the light source currents as shown on the right side of FIG. 11 as control in a chroma saturation enhancement mode.

In the chroma saturation enhancement mode, light intensity calculator 210 controls the light source currents for the red, the green, and the blue segment so as to enhance the red color light, the green color light, and the blue color light, which are the light of the colors emitted from the red, the green, and the blue segment in the first region. In other words, light intensity calculator 210 controls to increase the vividness of the image in order to appropriately display the image based on the image signal whose chroma saturation is high.

Here, in order to improve the vividness of the image recognized by the user based on the properties of the light, light intensity calculator 210 increases the light source current for the blue segment to be higher than those for the red and the green segment, and decreases the light source current for the green segment to be lower than those for the red and the blue segment. Further, light intensity calculator 210 increases the light source current for the white segment to be lower than the reference current. As the ratio between the light source currents for the red, the green, and the blue segment changes, the color temperature of the first transmitted light changes. Light intensity calculator 210 takes 7000 K as the target color temperature at this time and sets the light source current for each segment.

In this manner, by controlling the light source current for each segment in the chroma saturation enhancement mode, projector 100 according to this reference example makes the color temperature of the combined light for all the segments be 7000 K. In addition, projector 100 may ensure the chroma saturation of the image by this control.

Further, in the case in which the chroma saturation is medium as shown in the center of FIG. 11, light intensity calculator 210 controls the light source currents for the red, the green, and the blue segment according to the light source current for the white segment such that the color temperature of the combined light for all the segments takes a value around a range from 5000 K to 7000 K. In the center of FIG. 11, one example of the light source current control when the chroma saturation is medium is shown. FIG. 11 shows the case in which the color temperature of the combined light for all the segments is 6000 K in the center of the figure.

In this reference example, the case in which the target color temperature dynamically changes from 5000 K to 7000 K is described. However, the target color temperature is not limited to this example, and may be from 5500 K to 6500 K.

4-3. Effect

As described above, according to this reference example, the projector 100 controls the light source current so as to cause the color temperature of the combined light for all the segments to change dynamically according to the input image signal. With this, it is possible to project the image having the brightness and the vividness according to the image signal. Thus, projector 100 may improve the quality of the image.

Other Exemplary Embodiments

In the above description, the first to the third exemplary embodiments are described as the examples of the technique disclosed in the present application. However, the technique according to this disclosure is not limited to the above examples, and may be applied to an exemplary embodiment to which modifications, replacement, addition, omission, and the like are appropriately applied. Further, it is possible to provide a new exemplary embodiment by combining the components described in the first to the third exemplary embodiment.

Next, other exemplary embodiments will be described as examples.

In the first to the third exemplary embodiments, the first region of color wheel 150 includes the red, the green, and the blue segment, and the second region includes the white segment. The first region of color wheel 150 may include a plurality of segments where the color temperature of the combined light may be adjusting the light intensity for each segment. Further, the second region may include one or more segments. For example, the second region may include segments such as cyan, magenta, and yellow. In other words, the white color light may be generated using segments such as cyan, magenta, and yellow.

In the first to the third exemplary embodiments, light intensity calculator 210 controls the light intensity for each segment by controlling the current to be applied to light source 130. Light intensity calculator 210 may control the light intensity for each segment by controlling the voltage or the electrical power to be applied to light source 130. Further, it is possible to control the light intensity for each segment by controlling more than one of the above.

In the first to the third exemplary embodiments, the chroma saturation, the brightness, and the hue are extracted as the image analyzed information. It is possible to extract a color difference as the image analyzed information.

In the first to the third exemplary embodiments, the chroma saturation is used as a calculation reference of the light intensity of the light source 130, but the present disclosure is not limited to this, and brightness, hue, or a color difference may be used.

In the first to the third exemplary embodiments, image signal controller 250 corrects the chroma saturation in the correction of the image signal. Image signal controller 250 may correct brightness, hue, or a color difference in the correction of the image signal.

In the first to the third exemplary embodiments, it is described that regarding the chroma saturation of the image signal, light intensity calculator 210 changes the calculation of the light intensity between the cases in which the chroma saturation is high, medium, and low. Light intensity calculator 210 may change the calculation of the light intensity between two cases in which the chroma saturation is high and low. This also applies to the brightness.

As described above, the exemplary embodiments are described as the examples of the technique according to this disclosure. The appended drawings and the detailed description are provided for this purpose.

Therefore, the components described in the appended drawings and the detailed description include the components that are essential for solving the problems, as well as the components that are not essential for solving the problems in order to exemplify the above technique. Accordingly, the fact that the components that are not essential are shown in the appended drawings and the detailed description does not directly mean that the components that are not essential should be considered to be essential.

Further, as the exemplary embodiments are provided in order to exemplify the technique according to this disclosure, various modifications, replacement, addition, omission, and the like may be made within the scope of the disclosure or equivalence thereof.

This disclosure may be applied to a video projection device such as a projector.

What is claimed is:

1. A video projection device, comprising:
a splitter having a first region including a plurality of segments and a second region including at least one segment, and configured to split a light flux emitted from a light source into a plurality of light of colors in a time-divisional manner by having the light flux enter into each one of the segments;
a video display element configured to modulate the light of the colors based on an image signal to be input and to form an image; and
a controller configured to perform calculation such that when the image signal is determined to satisfy a predetermined first condition, a light intensity of the light entering into the second region is set higher than that in a case in which the first condition fails to be satisfied, that when the image signal is determined to satisfy a second condition different from the first condition, the light intensity of the light entering into the second region is set lower than that in a case in which the second condition fails to be satisfied, and that light intensities of the light entering into the segments of the first region are set so as to make a color temperature of a light flux be a predetermined white color target temperature, the light flux being obtained by combining first transmitted light generated by the light passing the first region and second transmitted light generated by the light passing the second region, wherein the controller varies light source currents while maintaining a ratio among the light source currents based on a result of the calculation, and the light source currents are applied to the light source, and determine the respective light intensities of the light entering into the segments of the first region.

2. The video projection device according to claim 1, wherein:
the first condition is such that brightness of the image signal is equal to or higher than a predetermined first threshold value and chroma saturation of the image signal is lower than a predetermined second threshold value; and
the second condition is such that the chroma saturation of the image signal is equal to or higher than a predetermined third threshold value.

3. The video projection device according to claim 1, wherein when a third condition is determined to be satisfied, the controller calculates the light intensity of the light entering into the second region to be low, and controls the light source based on a result of the calculation, the third condition being such that brightness of the image signal is lower than a predetermined fourth threshold value and chroma saturation of the image signal is lower than a predetermined second threshold value.

4. The video projection device according to claim 1, wherein:
the second region includes a white segment; and
the white color target temperature is equal to a color temperature of the second transmitted light.

5. The video projection device according to claim 1, wherein:
the second region includes a white segment; and
the white color target temperature is different from a color temperature of the second transmitted light.

6. The video projection device according to claim 1, wherein the controller calculates the light intensity such that brightness of the second transmitted light corresponds to target brightness.

7. A video projection device comprising:
a splitter having a first region including a plurality of segments and a second region including at least one segment, and configured to split a light flux emitted from a light source into a plurality of light of colors in a time-divisional manner by having the light flux enter into each one of the segments;
a video display element configured to modulate the light of the colors based on an image signal to be input, and to form an image; and
a controller configured to calculate a light intensity of the light entering into the second region based on the image signal, and light intensities of the light entering into the segments of the first region so as to make a color temperature of a light flux be a predetermined white color target temperature, the light flux being obtained by combining first transmitted light generated by the light passing the first region and second transmitted light generated by the light passing the second region, wherein the controller varies light source currents while maintaining a ratio among the light source currents based on a result of the calculation, and the light source currents are applied to the light source, and determine the respective light intensities of the light entering into the segments of the first region.

8. The video projection device according to claim 7, wherein the controller calculates the light intensity of the light entering into the second region based on at least one of brightness and chroma saturation of the image signal.

9. A video projection method for a video projection device including: a splitter having a first region including a plurality of segments and a second region including at least one segment, and configured to split a light flux emitted from a light source into a plurality of light of colors in a time-divisional manner by having the light flux enter into each one of the segments; and a video display element configured to modulate the light of the colors based on an image signal to be input and to form an image, the method comprising the steps of:
analyzing the image signal to generate analyzed information;
performing calculation based on the analyzed information such that when the image signal is determined to satisfy a predetermined first condition, a light intensity of the light entering into the second region is set higher than that in a case in which the first condition fails to be satisfied, that when the image signal is determined to satisfy a second condition different from the first condition, the light intensity of the light entering into the second region is set lower than that in a case in which the second condition fails to be satisfied, and that light intensities of the light entering into the segments of the first region are set so as to make a color temperature of a light flux be a predetermined white color target temperature, the light flux being obtained by combining first transmitted light generated by the light passing the first region and second transmitted light generated by the light passing the second region; and
varying light source currents while maintaining a ratio among the light source currents based on the calculated light intensities, the light source currents being applied to the light source, and determining the respective light intensities of the light entering into the segments of the first region.

10. The video projection method according to claim 9, wherein:
the first condition is such that brightness of the image signal is equal to or higher than a predetermined first threshold value and chroma saturation of the image signal is lower than a predetermined second threshold value; and
the second condition is such that the chroma saturation of the image signal is equal to or higher than a predetermined third threshold value.

* * * * *